(12) United States Patent
Bunger et al.

(10) Patent No.: US 11,564,374 B2
(45) Date of Patent: Jan. 31, 2023

(54) PET RESTING STRUCTURE AND METHODS OF FABRICATION THEREOF

(71) Applicant: Tuft & Needle, LLC, Phoenix, AZ (US)

(72) Inventors: Gene Bunger, Phoenix, AZ (US); Aaron Whitney, Phoenix, AZ (US)

(73) Assignee: TUFT & NEEDLE, LLC, Phoenix, AZ (US)

( * ) Notice: Subject to any disclaimer, the term of this patent is extended or adjusted under 35 U.S.C. 154(b) by 0 days.

(21) Appl. No.: 17/099,557

(22) Filed: Nov. 16, 2020

(65) Prior Publication Data

US 2021/0144955 A1 May 20, 2021

Related U.S. Application Data

(60) Provisional application No. 62/936,181, filed on Nov. 15, 2019.

(51) Int. Cl.
*A01K 1/035* (2006.01)

(52) U.S. Cl.
CPC .................... *A01K 1/035* (2013.01)

(58) Field of Classification Search
CPC .... A01K 1/035; A01K 1/0353; A01K 1/0157; A01K 1/0245; A01K 1/0254; A01K 1/033; A01K 1/006
USPC ....................................................... 119/28.5
See application file for complete search history.

(56) References Cited

U.S. PATENT DOCUMENTS

| 4,860,689 | A | * | 8/1989 | Stewart | A01K 1/0353 |
| | | | | | 119/28.5 |
| 5,127,367 | A | * | 7/1992 | Starowitz, Jr. | A01K 1/0157 |
| | | | | | 119/28.5 |
| D504,269 | S | * | 4/2005 | Faircloth | D6/601 |
| D564,709 | S | * | 3/2008 | Lamstein | D30/118 |
| D571,055 | S | * | 6/2008 | Song | D30/118 |
| 8,181,599 | B1 | * | 5/2012 | Jeffers | A01K 1/0353 |
| | | | | | 446/72 |
| 2002/0000741 | A1 | * | 1/2002 | Clay | A47D 1/00 |
| | | | | | 297/118 |
| 2003/0232556 | A1 | * | 12/2003 | Toro | B32B 27/12 |
| | | | | | 442/286 |
| 2006/0272582 | A1 | * | 12/2006 | Dunn | A01K 1/0353 |
| | | | | | 119/28.5 |

(Continued)

*Primary Examiner* — Brady W Frazier
*Assistant Examiner* — Zoe Tam Tran
(74) *Attorney, Agent, or Firm* — ArentFox Schiff LLP

(57) ABSTRACT

The pet resting structure comprises a base and a pad, wherein the pad is selectively receivable within a recess of the base. The base is constructed of a single continuous member of foam material that provides structural integrity and of a cover that may encapsulate the foam material, protecting it from various forms of damage. The pad may comprise a cushioning material providing a deformable pet resting surface and an encapsulating cover. Further, both covers may include a waterproof inner lining to protect the foam material from water damage and non-slip pad to prevent unwanted movement during use. The pet resting structure also includes at least one fastener such that the pad and base are selectively securable. Additionally, a method of constructing the base includes injecting a liquid foam material within a single part mold, such that upon its solidification, a solid foam material may then be removed.

11 Claims, 11 Drawing Sheets

(56) References Cited

U.S. PATENT DOCUMENTS

| | | | |
|---|---|---|---|
| 2008/0066687 A1* | 3/2008 | Leung | A01K 1/0353 119/28.5 |
| 2008/0202434 A1* | 8/2008 | Arnold | A01K 1/0353 119/28.5 |
| 2008/0236501 A1* | 10/2008 | Hargrave | A01K 1/0353 119/28.5 |
| 2008/0245311 A1* | 10/2008 | Kline | A01K 1/0272 119/28.5 |
| 2009/0100602 A1* | 4/2009 | Rathie | A01K 1/0353 5/655 |
| 2013/0104806 A1* | 5/2013 | Dennis | A01K 1/0353 119/28.5 |
| 2014/0230735 A1* | 8/2014 | Coulter | A01K 1/0353 119/28.5 |
| 2016/0106061 A1* | 4/2016 | Nelson | A01K 1/0353 119/28.5 |
| 2016/0192617 A1* | 7/2016 | Murphy | A47G 9/0238 119/28.5 |
| 2017/0079238 A1* | 3/2017 | Ren | A01K 1/0353 |
| 2019/0021277 A1* | 1/2019 | Godfrey | A01K 1/0353 |
| 2019/0183090 A1* | 6/2019 | Komatsubara | A01K 1/0353 |
| 2019/0200570 A1* | 7/2019 | Abel | A01K 1/0353 |
| 2019/0297839 A1* | 10/2019 | Miller | A01K 29/00 |
| 2019/0313601 A1* | 10/2019 | Angevine | A01K 1/0353 |
| 2020/0060226 A1* | 2/2020 | Johnson-Hovey | A01K 1/0353 |
| 2020/0315130 A1* | 10/2020 | Woolf | A45F 3/14 |

\* cited by examiner

PET RESTING STRUCTURE AND METHODS OF FABRICATION THEREOF

CROSS REFERENCE TO RELATED APPLICATIONS

This application claims priority to U.S. Provisional Patent Application No. 62/936,181, filed Nov. 15, 2019, the entire contents of which is hereby incorporated in their entirety

BACKGROUND OF THE TECHNOLOGY

Field

Aspects of the present disclosure relate to furniture devices for resting, lounging, or similar activities of animals, including household pets, and methods of manufacture and use thereof.

Background

Pets, such as dogs, cats, birds, etc., have been welcomed into human homes since before the start of recorded history. Though initially domesticated from their wild counterparts for functional or work activities, such as hunting, the relationship between man and animal has since evolved to be a bond instead defined primarily by companionship. However, the past decade has seen an even greater, if not peculiar, shift in the pet-human relationship dynamic: human owners now view their pets not as peripheral members of the family, but instead as members equal in value to themselves and their loved ones.

Termed pet humanization, this pet-owner dynamic relationship dynamic shift has resulted in an increasing, customer-driven demand for high quality goods designed specifically for pets that resemble comparable products utilized by their human owners in the structure, function and quality. For example, there has been an increase in gourmet pet food made from natural, organic ingredients that mimic the human demand for high quality human food options. In another example, pet treats resembling quintessentially human deserts, such as cookies and ice cream, are easy to find in an everyday grocery store. Extending beyond food, human owners may now purchase their pet companions human-like clothes, such as sweaters, jackets, and even Halloween costumes.

However, despite the modern prevalence of the pet humanization movement and the consequent development of a variety of high quality human inspired pet products, there remains a noticeable absence within the prior or related art of pet resting structures, such as dog beds, designed to both meet the standards of human beds, couches, or other similar resting objects, and that also meet the distinctly non-human needs of their pet users. For example, some pets, such as young dogs, will defecate, vomit, or otherwise soil their pet resting structure such as due to not being fully trained, because they are sick, or otherwise simply in a playfully destructive mood. In other situations, energetic, nervous, or teething pets may seek to dig, chew, claw, or otherwise destroy their pet resting structure. Yet again, however, there is a notable absence of pet resting structures that combine the modern demand for human inspired quality and function standards, with pet-conscious needs for human owners who wish to treat their non-human companions as true members of the family.

Specifically, many current pet resting structures within the related art comprise multiple component pieces, such as multiple foam cushion components, wherein the multiple component pieces must be assembled upon purchase. This approach not only increases the difficulty of both human and non-human pet resting structure use, but also increases the probability such resting structure may disassemble or otherwise detach during use. Further, certain pet resting structures within the related art require assembly with a cover piece that contains a multitude of confusing zippers that also make the pet resting structure assembly for use or disassembly for cleaning unnecessarily complicated. In addition, many pet resting structures within the related art require fabrication of foam components in multiple pieces that then require assembly upon purchase, in addition to introducing an additional plurality of unwanted problems, such as potential malfunction of adhesives, misaligned components, or other similar dysfunctions.

SUMMARY

Consequent of the deficiencies described above, as well as others, there remains an unmet need for an pet resting structure that combines the modern demand for human inspired quality and function standards in pet products, along with the ever present need for pet conscious designs equipped to address animal specific needs.

In view of the above problems and shortcomings, as well as others, aspects of the present disclosure relate, among other things, to high quality pet resting structures and methods of fabrication and use thereof. According to various aspects, the pet resting structure of the present disclosure may comprise a base component and a pad component, wherein the pad component may be designed to be selectively receivable within a recess in the base component. Further, the base component may be constructed of a single continuous member of high quality foam material that provides the structural integrity of the pet resting structure and a cover component, wherein the cover component may encapsulate the foam material, protecting it from various forms of damage. Further, the cover may include a waterproof inner lining and non-slip pad. The waterproof inner lining may further allow the cover to protect the base support structure component from damage, and the non-slip pad may aid in preventing the pet resting structure from unwanted movement during use. The pad component may similarly include a cushioning material and a cover component, wherein the cushioning material provides a plush, or otherwise similarly deformable surface for a pet user to rest upon. The cover component may encapsulate the cushioning material, protecting the cushioning material from various forms of damage. Further, the cover may also include a waterproof inner lining and a non-slip pad, similar to the cover encapsulating the base component. Additionally, the pet resting structure may include at least one fastening mechanism such that the pad component may be selectively secured to the base component, or the base component selectively secured to the pad component.

According to various aspects, the cushion component may selectively lie on top of, rest upon, or be otherwise supported by the base component.

The two part base component and a pad component system, as described above may allow the pet resting structure to mimic the standard construction of human beds, couches and other similar resting surfaces. For example, human resting structures are typically constructed to include a similar two part system defined by the interaction of a base, functioning primarily as a support structure and a pad component, functioning to supply a cushion member. Further, the inclusion of high quality materials such as the waterproof lining, a non-slip base pad, hook, and anchor components may adapt the human inspired resting pad system design in a variety ways to better meet the additional needs of pets and their human owners.

Additional advantages and novel features of these aspects will be set forth in part in the description that follows, and in part will become more apparent to those skilled in the art upon examination of the following or upon learning by practice of the disclosure.

DETAILED DESCRIPTION

Figure 1:
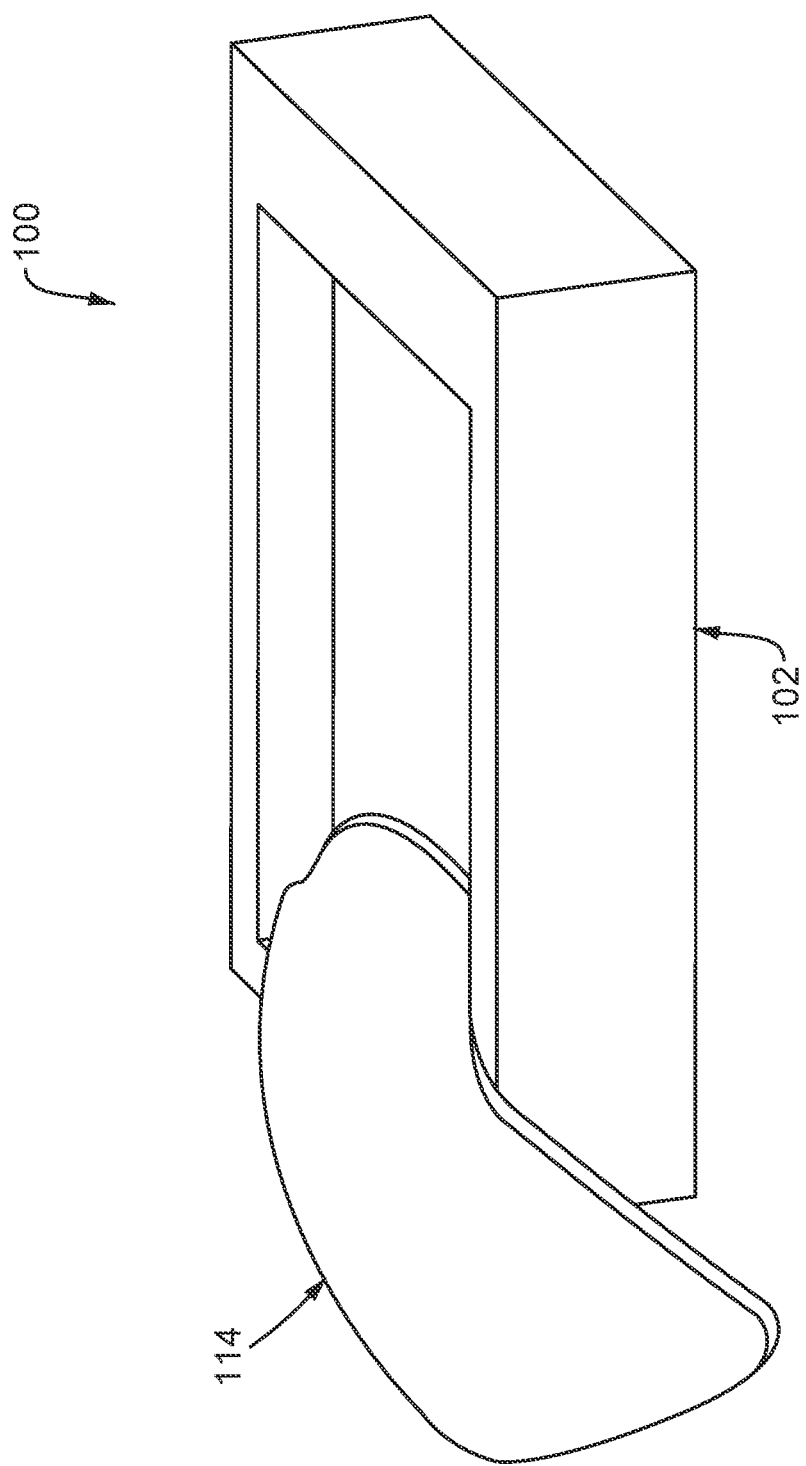
FIG. 1 illustrates a perspective view of a pet resting structure, according to aspects of the present disclosure.

FIG. 1 illustrates in a perspective view an example pet resting structure 100, wherein pet resting structure 100 may be utilized by a variety of different household pets, such as dogs or cats, for sleeping, lounging, or other similar activities. Pet resting structure 100 may be comprised of two components, including a base 102 and a pad 104. Base 102 and pad 104 may work in concert, such that base component 102 may provide a sufficiently ridged structural base to support the weight of the pet user, while maintaining a sufficiently non-rigid indention force deflection (IDF) value so as to remain comfortable for pet use. Pad 104 may be selectively supportable by base 102. For example, pad 104 may rest upon or reside on top of base 102 or as in another example, pad 104 may be detached from base 102 and placed in a variety of separate locations that may not have room to accommodate base 102, such as in the back seat of a car. Pad 104 may provide a sufficiently comfortable resting surface for the pet user independent its placement or location.

According to various aspects, base 102, wherein base 102 may comprise a formed foam material 106 encapsulated by a first cover 108. The foam material may include but not be limited to, latex foam, polyurethane foam or any similar air-filled matrix structures that may include a variety of lightweight, buoyant, cushioning, thermal insulating, acoustic insulating, or impact damping properties. Base 102 may also include sufficiently ridged features, such as bolsters 116, so as to enhance support for the weight of a pet, such as a dog, while also maintaining appropriate levels of comfort. Furthermore, the foam material comprising base 102 maintain density and firmness values such that base 102 may sufficiently support the weight of the pet user while maintaining the structural integrity of a pet resting structure, such as pet resting structure 100. In one example, base 102 may have a density of approximately 3.0625 pounds per cubic foot, and an IDF value of 25.9. However, the density and firmness values may be varied or otherwise optimized to values other than the values included as an example above. Additionally, to ensure that base 102 may adequately support pets of different sizes and weights, base 102 may also be constructed in a similar variety of sizes.

Figure 2:
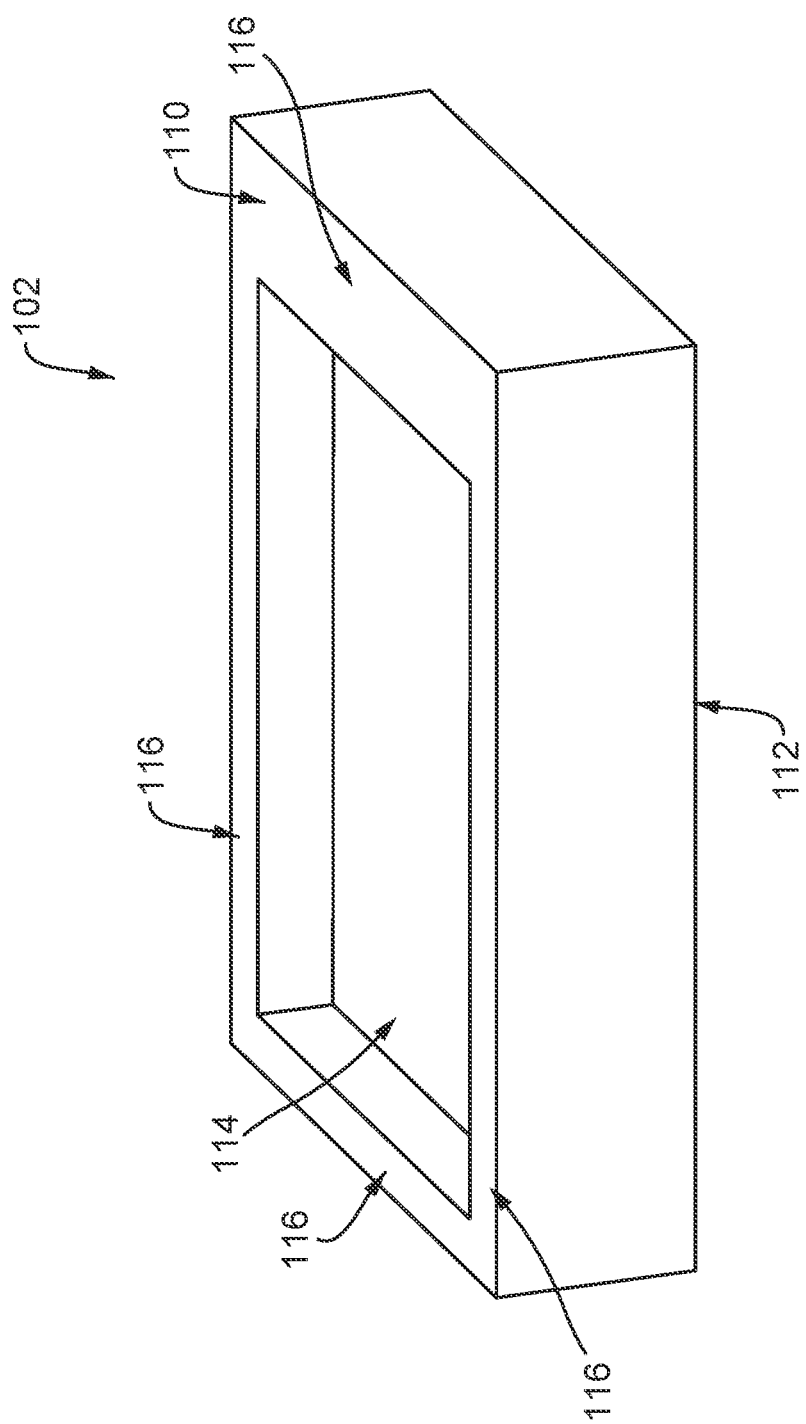
FIG. 2 illustrates a perspective view of a base component of a pet resting structure, in accordance with aspects of the present disclosure.

As illustrated in FIG. 2, base 102 may be formed to have a generally rectangular cuboid shape, wherein the rectangular cuboid may include a first planar base surface 110 and a second planar base surface 112, wherein first base surface 110 and second base surface 112 may be parallel. Additionally, first base surface 110 may include a recess 114, wherein recess 114 may receive pad 104. In one example, the rectangular cuboid base 102 may include at least externally facing rounded vertex, such that the rounded vertex may form a comparatively smoother and thus safer outer edge. Further, recess 114 may contain a plurality of ridged features, as described above. Recess 114 may form a plurality of bolsters 116 approximately perpendicular in direction to first planar surface 110 and second planar surface 112, wherein bolsters 116 may support pad 104 when received in recess 114, in addition to retaining pet-generated body heat within pet resting structure 100 comparable to how heat is retained in a dug hole or cave structure. In one example, recess 114 may form four bolsters 116. However, in another example, pet resting structure 100 may include more than four bolsters and less than four bolsters, so as not to be limited to four bolsters 116.

Figure 3:
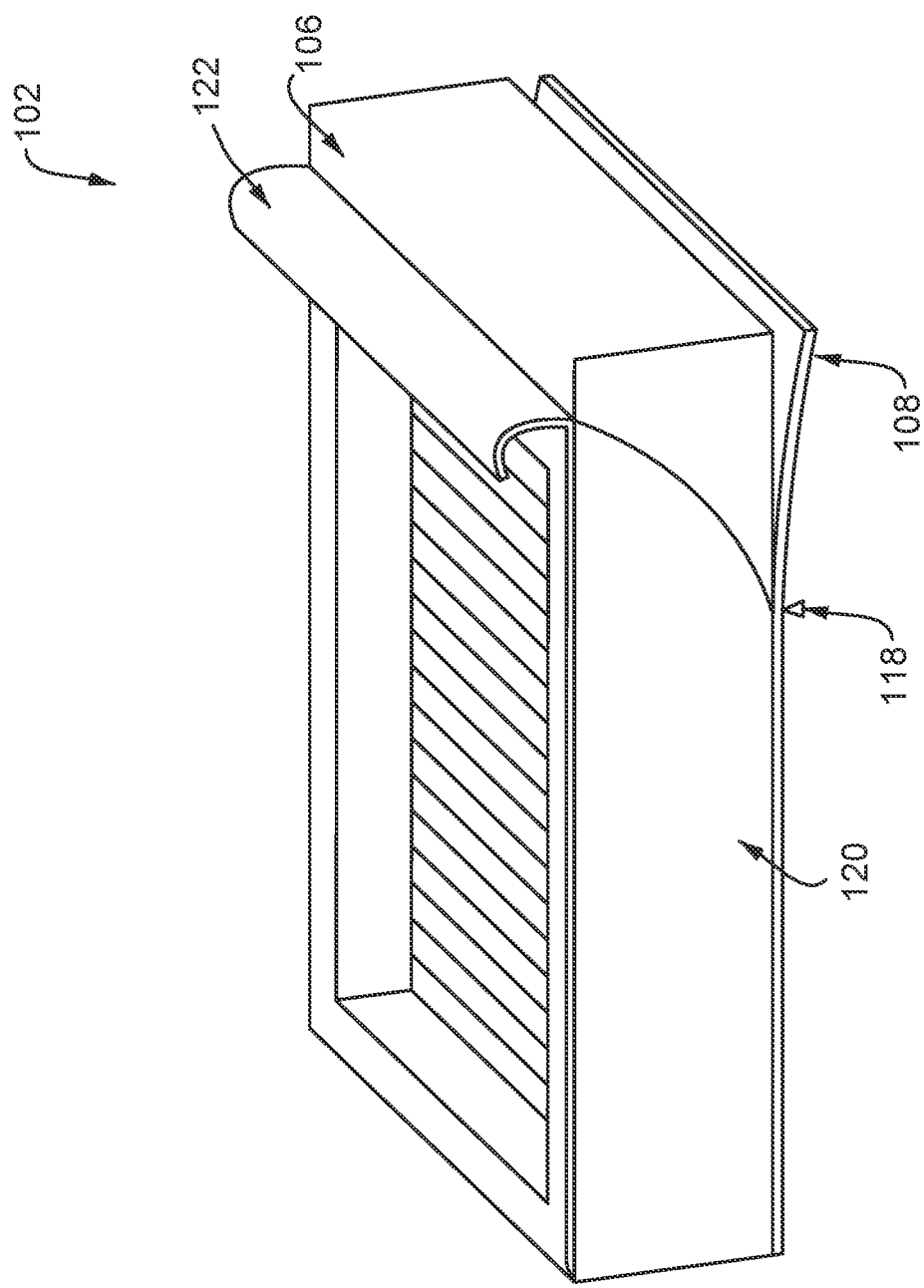
FIG. 3 illustrates a perspective view of a cover component encapsulating a base component of a pet resting structure, in accordance with aspects of the present disclosure.

According to various aspects, as illustrated in FIG. 3, base 102 may include a first cover component 118, wherein first cover component 108 may encapsulate foam material 106. This configuration of first cover component 108 and foam material 106 may protect foam material 106 from various forms of damage including but not limited to dirt, food, vomit, dust, debris, saliva, etc. Further, first cover component 108 may be easily removable from base 102 via a zipper 118 so that first cover component 108 may be machine washed, hand washed, or otherwise cleaned of such various forms of damage. Additionally, first cover component 108 may be comprised of at least two fabric materials, wherein the first fabric material may comprise an outer layer 120 and the second fabric material may comprise an inner membrane 122. In one example, outer layer 120 may be comprised of canvas, wherein canvas may include a variety of different blends of cotton, linen, or hemp material. However, in another example, outer layer 120 may comprise or otherwise be derived from a variety of different synthetic, plant, or animal materials including by not limited to wool, silk, cotton, flax, jute, bamboo, nylon, polyester, polyester blends, acrylic, rayon, or some combination thereof. Further, outer layer 120 may be sufficiently soft for daily pet usage, while also remaining adequately durable in order to withstand the effects of standard wear and tear also associated with daily pet usage.

Figure 4:
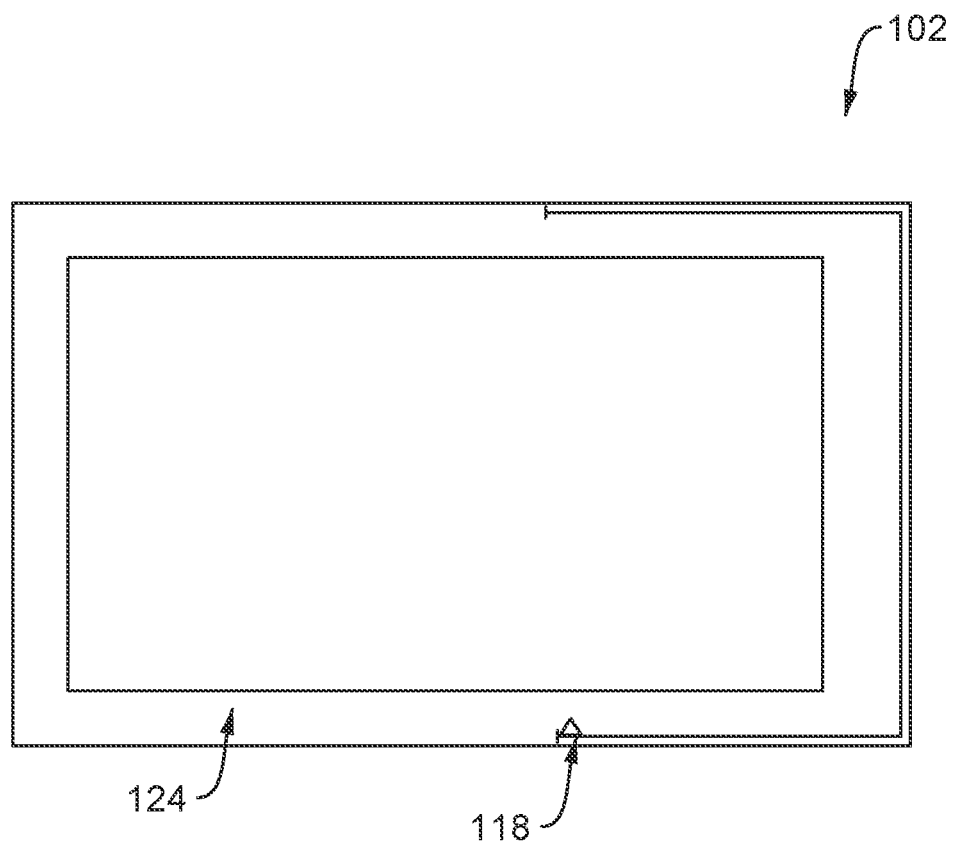
FIG. 4. illustrates a bottom view of a base component including a breathable panel component, in accordance with aspects of the present disclosure.
Figure 5:
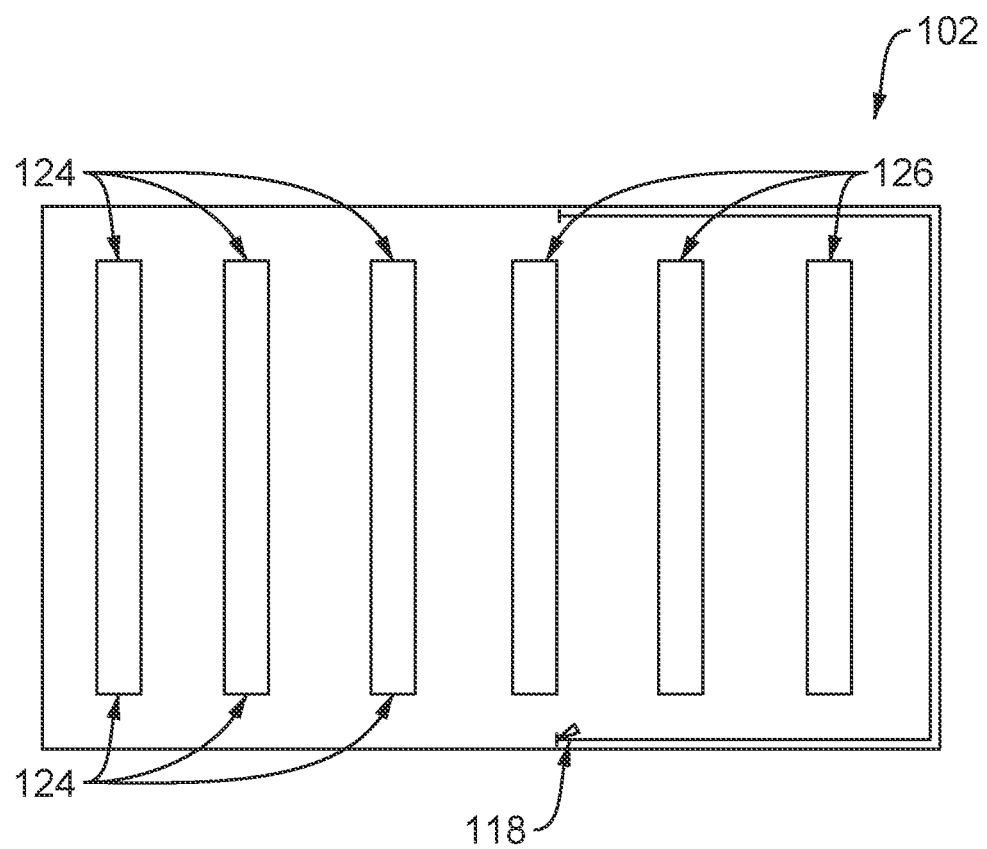
FIG. 5 illustrates a bottom view of a base component including a plurality of breathable panel components, in accordance with aspects of the present disclosure.

Inner membrane 122 may be attached to outer layer 120 such that outer layer 120 may be exposed primarily to the surrounding environment, and inner membrane 122 may have one surface abutting or otherwise proximal to encapsulated foam material foam material 106. Inner membrane 122 may be permanently attached to outer layer 120 via a variety of adhesion methods such as adhesive glue, interlocking material, or stitching, for example. Additionally, inner membrane 122 may be comprised of a waterproof or otherwise water resistant material such as polyurethane, polyvinyl chloride, silicone elastomer, fluoropolymers, or wax, for example. However, because inner membrane 122 may be waterproof, inner membrane 122 may, consequently, be airtight, preventing air from passing through the otherwise breathable outer layer 120. Consequently, in one example, first cover component 108 may also include a panel 124, as illustrated in FIG. 4. However, in another example, first cover component 108 may include a plurality of panels 126, as illustrated in FIG. 5, wherein panel 124 or panels 126 may provide a breathable section of first cover component 108. Including a breathable section within cover component 108 allows for the passage of air flow between inside and outside of first cover component 108, preventing the unwanted accumulation of air. Furthermore, panel 124 or panels 126 may be comprised of a non-slip material, such as rubber, for example, which may provide an additional advantage of aiding in the prevention of unwanted movement of first cover component 108 and base 102.

Figure 6:
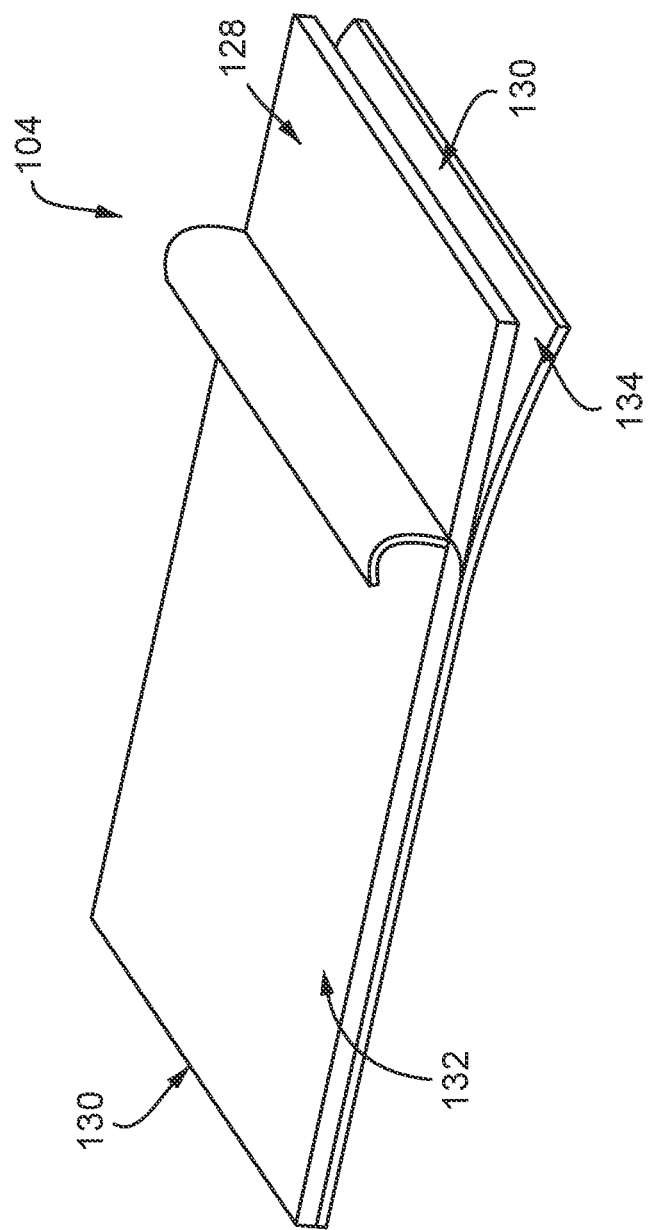
FIG. 6 illustrates a perspective view of a cover component encapsulating a cushion material of a pet resting structure, in accordance with aspects of the present disclosure.

Pad 104, as illustrated in FIG. 6, according to various aspects of the present disclosure, may comprise a cushion material 128 and a second cover component 130, wherein second cover component 130 may encapsulate cushion material 128 in order to protect cushion material 128 from dirt, food, or other undesirable particulates which may be tracked onto pad 104 via a pet user. Cushion material 128 may comprise a cushioning material such as feather, down, wool, synthetic, memory foam, or cotton, for example, such that cushion material 128 may be comparatively more plush or deformable than foam material 106 of base 102. Further, cushion material 128 may have a primarily function of providing a comfortable resting surface for a pet user, wherein cushion material 128 may not need any structural, sturdy, or otherwise stabling features. Second cover component 130 may be similar is structure to first cover component 108, as described above in reference to base 102. For example, second cover component 130 may comprise at least two fabric materials, wherein the first fabric material may comprise an outer layer 132 and the second fabric material may comprise an inner membrane 134. Outer layer 132 may be comprised of canvas, wherein canvas may include a variety of blends of cotton, linen, or hemp material. However, in another example, outer layer 132 may comprise or be otherwise derived from a variety of different synthetic, plant, or animal materials including but not limited to wool, silk, cotton, flax, jute, bamboo, nylon, polyester, polyester blends, acrylic, rayon, or some combination thereof. Further, outer layer 132 may be sufficiently soft and comfortable for daily pet usage, while also being adequately durable to withstand standard wear and tear also associated with daily pet usage.

Figure 7A:
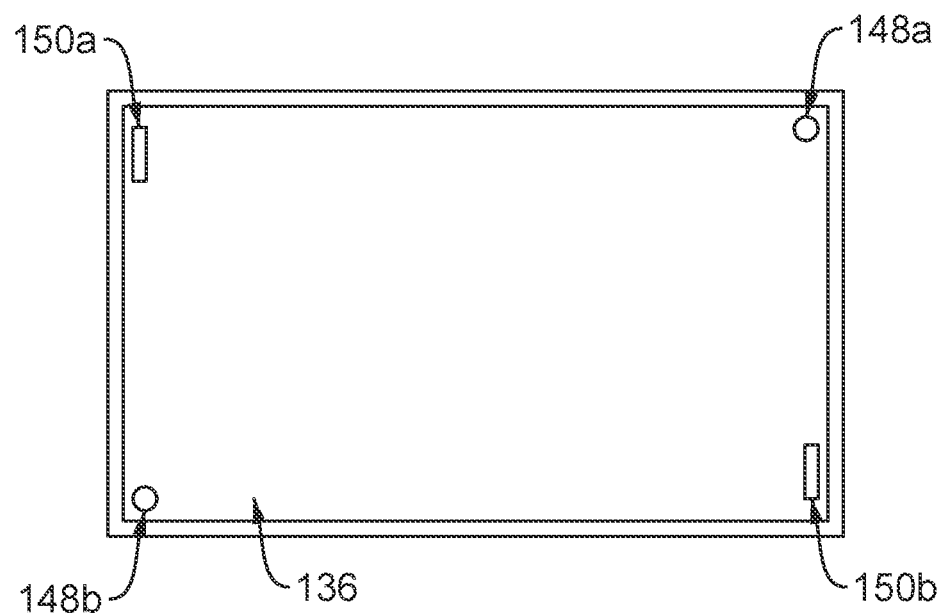
FIG. 7A illustrates a bottom view of a pad component including a breathable panel component, in accordance with aspects of the present disclosure.
Figure 7B:
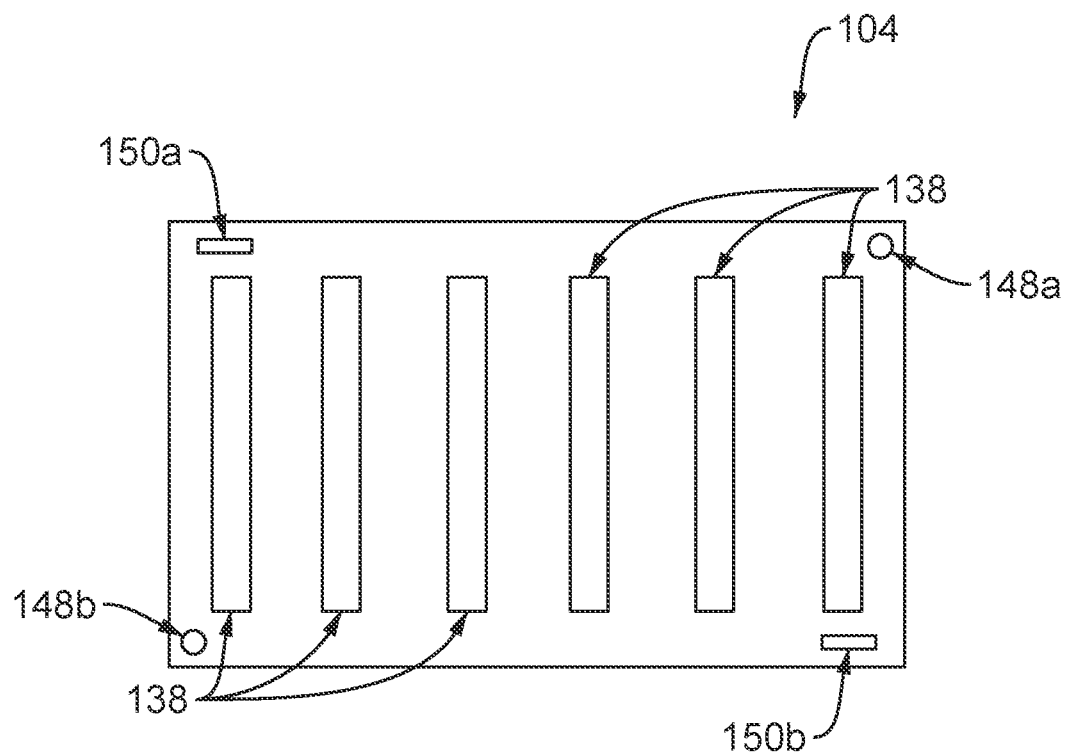
FIG. 7B illustrates a bottom view of a pad component including a plurality of breathable panel components, in accordance with aspects of the present disclosure.

According to various aspects of the present disclosure, inner membrane 134 may be attached to outer layer 132 such that outer layer 132 may primarily face the surrounding environment, and inner membrane 134 may primarily abut or have a surface that faces cushioning material 128. Inner membrane 134 may be permanently attached to outer layer 132 via a variety of adhesion methods such as adhesive glue, interlocking material, or stitching, for example. Additionally, inner membrane 134 may be comprised of a waterproof or otherwise water resistant material such as polyurethane, polyvinyl chloride, silicone elastomer, fluoropolymers, or wax, for example. However, because inner membrane 134 may be waterproof, inner membrane 134 may consequently also be airtight, preventing air from passing through the otherwise breathable outer layer 132. Consequently, without any other additional modifications to second cover component 130, air may remain trapped within the second cover component 130, forming uncomfortable air pockets that prevent easy pet use. Thus, as illustrated in FIG. 7A and FIG. 7B, second cover component 130 may also include a panel 136 or a plurality of panels 138, wherein panel 136 comprises a breathable material such as canvas. Further, panel 136 or panels 138 may be comprised of a non-slip material, such as rubber, for example, which may provide an additional advantage of aiding in the prevention of unwanted movement of second cover component 130 and pad 104. Furthermore, panel 136 or panels 138 may allow for the use of pad 104 separate from base 102, especially in situations including space restrictions, such as when travelling via automobile. Additionally, second cover component 130 may be easily removable from cushioning material 128 via a second zipper 140, wherein second cover component 130 may be easily removable for hand or machine washing when second cover component 130 needs to be cleaned.

Figure 8:
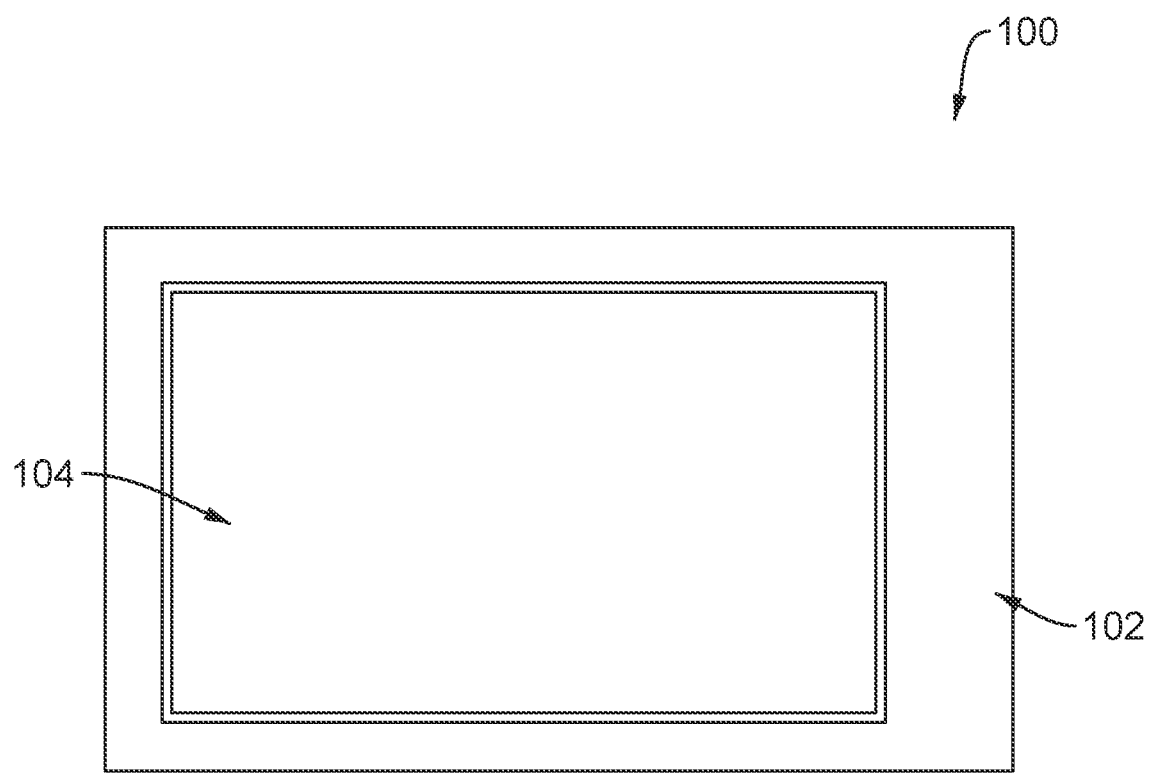
FIG. 8 illustrates a top view of a base component with a corresponding cover component engaged there within of a pet resting structure, in accordance with aspects of the present disclosure.

According to an aspect of the present disclosure, FIG. 8 illustrates a top view of the previously described example, wherein pad 104 rests within recess 114 of base 102. In this example, a pet user may lie upon pad 104 when resting, such that the pet user is sufficiently supported by the structural integrity of base 102, but maintains minimal contact with base 102 in order to optimize comfort via contact with pad 104. Additionally, this aforementioned design may decrease the duration and quantity of contact a pet initiates with base 102, and thus may decrease the amount of cleaning needed to keep base 102 clean.

Figure 9:
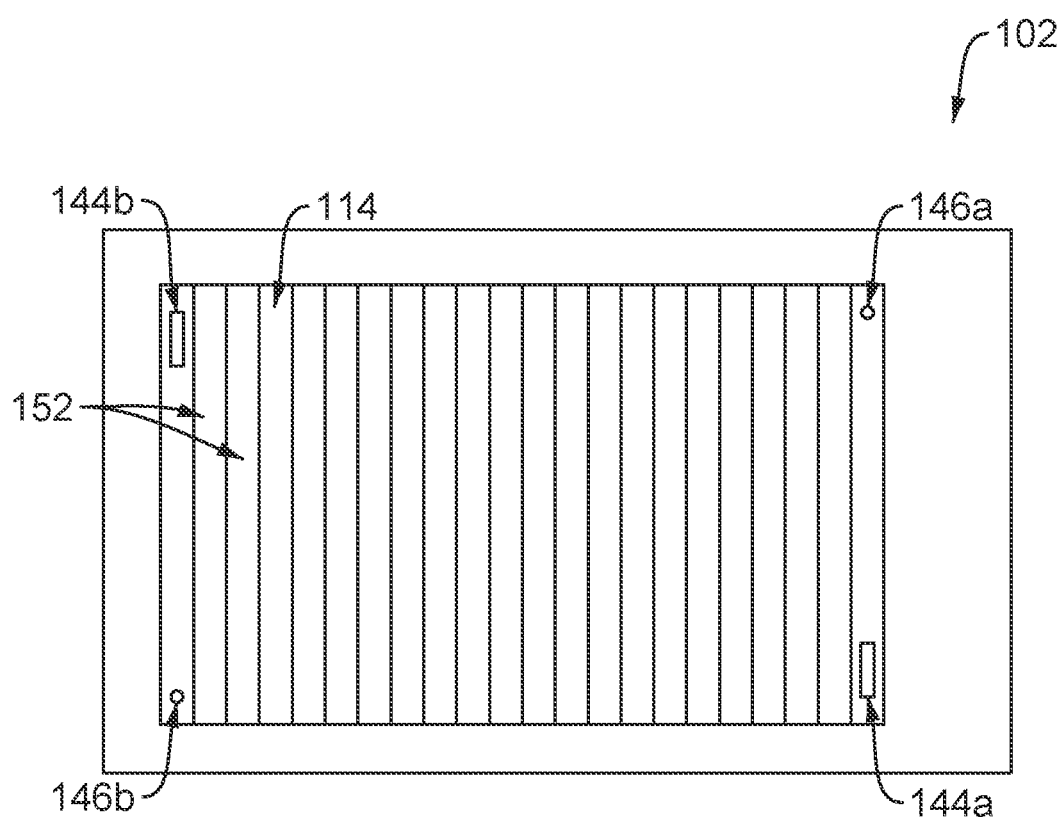
FIG. 9 illustrates a top view of a cover component including fastener components encapsulating a base component of a pet resting structure, in accordance with aspects of the present disclosure.
Figure 10A:
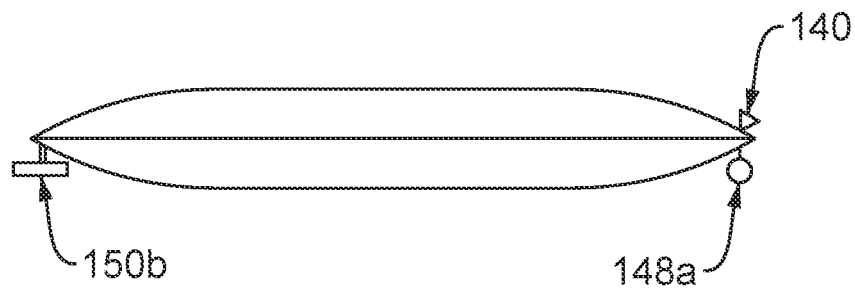
FIG. 10A illustrates a side view of an example cushion component of a pet resting structure, in accordance with aspects of the present disclosure.
Figure 10B:
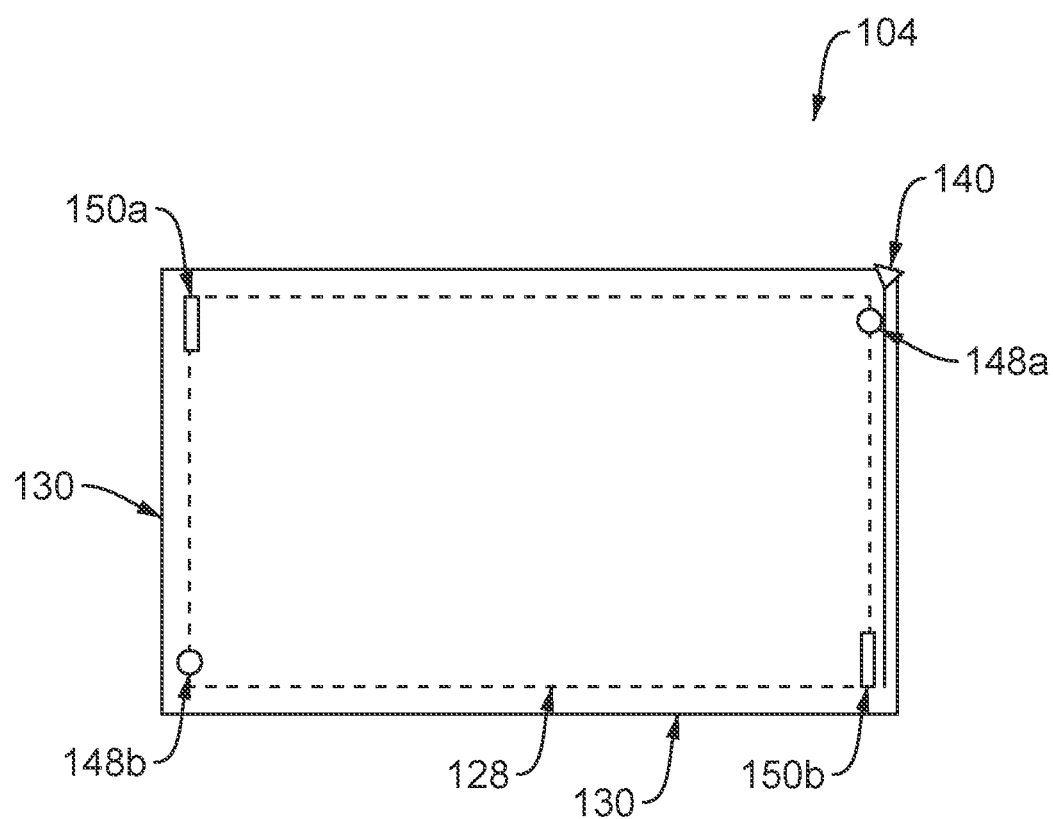
FIG. 10B illustrates a top view of an example cushion component of a pet resting structure, in accordance with aspects of the present disclosure.

In order to promote the interaction of base 102 with pad 104, a pet resting structure, such as pet resting structure 100 of FIG. 1, may include at least one fastener, described below. The fastener may comprise a wide variety of configurations and fastening methods, such as buttons, a plurality of small interlocking hooks, rope, etc. In one example, however, pet resting structure may include four fastening hooks corresponding to four fastening anchors. As illustrated in FIG. 9, first cover component 108 may include two fastening hooks 144a and 144b and two fastening anchors 146a and 146b, wherein fastening hooks 144a and 144b may include a first configuration visibly and functionally different than fastening anchors 146a and 146b of a second configuration. Further, as illustrated in FIG. 10A-10B second cover component 130 may include fastening hooks 148a and 148b that may interact with fastening anchors 146a and 146b, in addition to fastening anchors 150a and 150b that may interact with fastening hooks 144a and 144b. Additionally, in this particular example, fastening hooks 144a and 144b may be attached to first cover component 108, wherein upon placing foam material 106 within first cover component 108, fastening hook 144a may be located approximately within one corner of recess 114 and fastening hook 144b may be located in another corner of recess 114 so as to be located in the diagonally opposing corner of recess 114 in which fastening hook 144a was located. Conversely, fastening anchors 146a and 146b may also be attached to first cover component 108, wherein fastening anchor 146a may be located in one corner adjacent to fastening hooks 144a and 144b, wherein fastening anchor 146b may be located in the last remaining diagonally opposing corner of recess 114, when foam material 106 is encapsulated by first cover component 108. To ensure that fastening hooks 144a and 144b may interact with corresponding fastening anchors 148a and 148b, wherein fastening anchors 148a and 148b may be attached to the corresponding corners of second cover component 130. In another example, fastening hooks 144a and 144b may comprise male configured hooks that are capable of interacting with corresponding fastening anchors 148a and 148b, wherein fastening anchors 148a and 148b may comprise female configured anchors. Conversely, fastening anchors 146a and 146b may comprise female configured hooks that are capable of interacting with corresponding fastening hooks 150a and 150b, wherein fastening hooks 150a and 150b may comprise male configured hooks.

Figure 11:
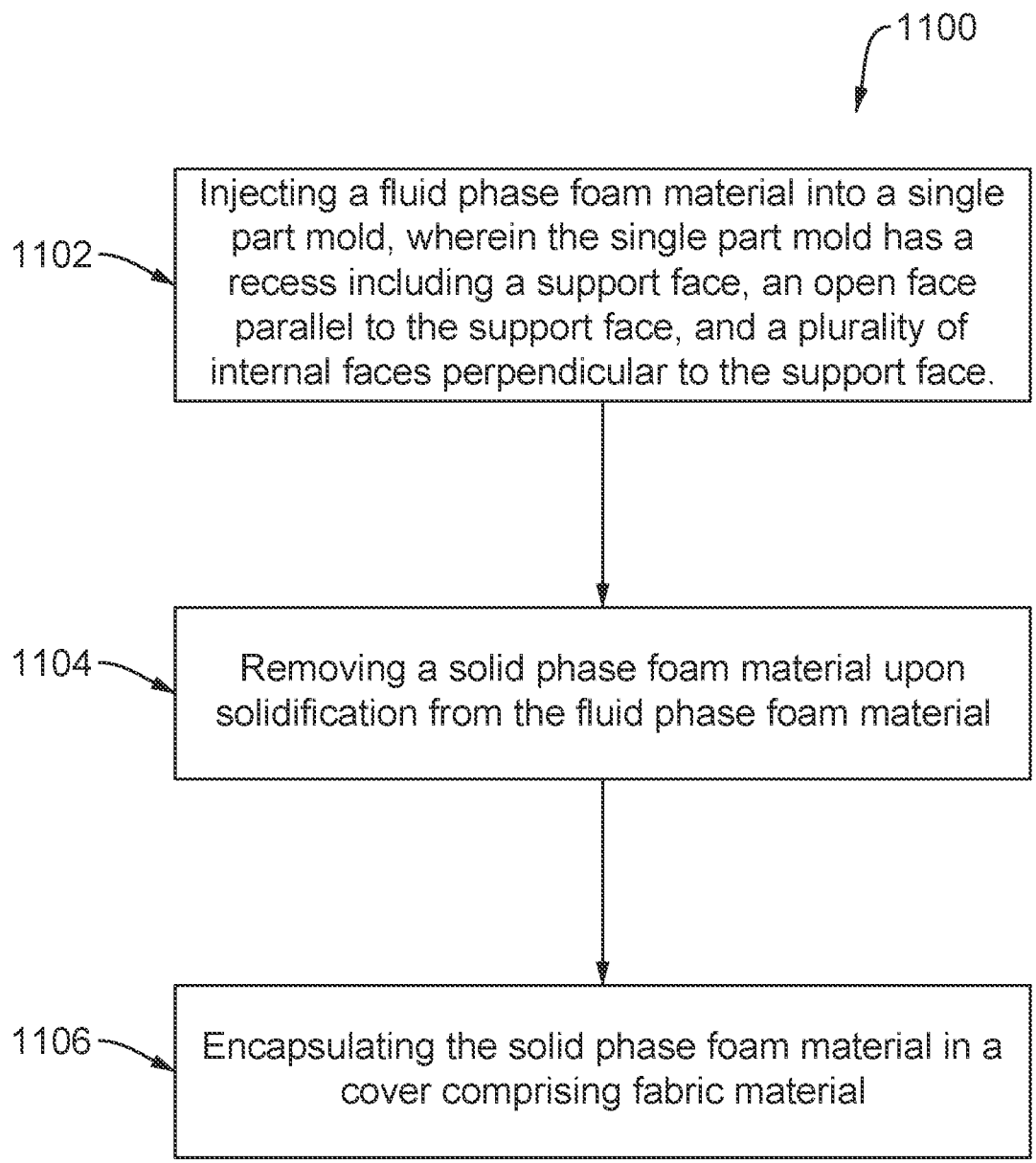
FIG. 11 illustrates a method flow describing the fabrication process for a pet resting structure, in accordance with aspects of the present disclosure.

FIG. 11 demonstrates a fabrication method 1100 that may be employed to form foam material 106 of base 102 in a single, easily replicable, mass reproducible process. Method 1100 may first involve pouring, injecting, or otherwise placing a liquid phase foam material within a mold to a predetermined height 1102. Mold 1102 may comprise a single part mold, including no more than one component, comparable to a tray for baking muffins or cupcakes. Following, upon the solidification of liquid phase foam material, the solid phase foam material 1104 may then be removed from mold 1102, forming a single component foam material such as the formed foam material 106 illustrated in FIG. 3. Following, the solid phase foam material 1104 may be encapsulated by a cover comprising fabric material 1106. This single mold fabrication process allows for a cost effective and comparatively simple manufacturing process at least in part because it may not require any machine or manual foam cutting, as such processes add to labor costs, reduce efficiency, and increase the possibility of improperly shaped or miss formed finished formed foam material 1104. Additionally, method 1100 may also not require the use of any type of adhesive agent, such as glue, which also may reduce labor costs, reduce the probability of producing a misshapen formed foam material 1104, and consequently increases the efficiency of fabricating a pet resting structure, according to various aspects of the present disclosure.

Though FIG. 11 illustrates an example method 1100 of fabricating a base structure component, such as base 102 of FIG. 1. However, though method 1100 may be an example method, there may be other suitable methods for fabricating such a foam base component. For example, a base component may be fabricated using a foam band saw. In this alternative method, a foam band saw may be utilized to cut a base component from a block of foam to the desired shape and size. In another example, a base component may be fabricated using a combination of a foam band saw and laminated foam. In this example, a base component may be cut to the desired shape and size from a single block of foam, wherein additional foam may be cut and then subsequently wrapped around the straight edges of the previously cut foam and laminated in place, so as to form rounded edges, and thus a base component. Additionally, a base component may be formed via a contour cut of various foam components, wherein the various foam components may then be attached so as to form a bases component of the desired shape and size.

Additional advantages and novel features relating to aspects of the present disclosure will be set forth in part in the description that follows, and in part will become more apparent to those skilled in the art upon examination of the following or learning by practice thereof.

What is claimed is:

1. A pet resting structure, comprising:
   a base, the base including:
   a formed foam material, wherein the formed foam material includes a rectangular cuboid shape including two parallel base surfaces and four bolsters approximately perpendicular in direction to the two parallel base surfaces, wherein at least one base surface includes a recess, and wherein three of the four bolsters being approximately equal in thickness and one of the four bolsters being thicker than the three bolsters when the pet resting structure is viewed in a plan view;
   a first cover encapsulating the formed foam material, the first cover including:
   at least two fabric layers, a first layer of the at least two fabric layers having a first surface abutting the formed foam material and a second surface abutting a surface of a second layer of the at least two first cover fabric layers;
   a non-slip layer abutting at least a portion of the second layer of the at least two fabric layers, wherein the non-slip layer comprises a permeable, non-slip material;
   a pad selectively supportable by the base, the pad including:
   a cushioning material;
   a second cover encapsulating the cushioning material, the second cover including:
   at least two fabric layers, a first layer of the at least two fabric layers having a first surface abutting the cushioning material and a second surface abutting a surface of a second layer of the at least two second cover fabric layers;
   at least one fastener, wherein the at least one fastener is selectively securable to at least one selected from a group consisting of the base and the pad.

2. The pet resting structure of claim 1, wherein the second layer of the first cover comprises a waterproof or water resistant material.

3. The pet resting structure of claim 1, wherein the second layer of the second cover comprises a waterproof or water resistant material.

4. The pet resting structure of claim 1, wherein at least one vertex of the rectangular cuboid is rounded.

5. The pet resting structure of claim 1, wherein the at least one fastener includes a first fastener of a first configuration and a second fastener of a second configuration.

6. The pet resting structure of claim 5, wherein the first fastener is a male configured hook.

7. The pet resting structure of claim 6, wherein the second fastener is a female configured anchor and capable of interacting with the first fastener.

8. The pet resting structure of claim 1, wherein the recess includes a rectangular cuboid shape comprising:
   a support face;
   an open face parallel to the support face; and a plurality of internal faces perpendicular to the support face.

9. The pet resting structure of claim 8, wherein the plurality of internal faces perpendicular to the support face includes four internal faces perpendicular to the support face.

10. The pet resting structure of claim 8, wherein the support face includes a plurality of ridge features.

11. The pet resting structure of claim 1, wherein the first cover includes a panel having a plurality of ridge features.

* * * * *